United States Patent Office 3,295,949
Patented Jan. 3, 1967

3,295,949
METHOD FOR THE CONTROL OF UNDESIRABLE PLANT GROWTH
Bryant Leonidas Walworth, Pennington, N.J., assignor to American Cyanamid Company, Stamford, Conn., a corporation of Maine
No Drawing. Original application Sept. 27, 1963, Ser. No. 311,947. Divided and this application Sept. 2, 1965, Ser. No. 484,742
8 Claims. (Cl. 71—2.7)

This application is a divisional application of application Serial No. 311,947, filed September 27, 1963, now abandoned.

This invention relates to a method for the control of undesirable plant growth. More particularly, it relates to a specific compound and the salts thereof which exhibits both pre-emergence and post-emergence herbicidal activity.

The successful cultivation of crops normally requires the control of undesirable vegetation with a minimum expenditure of time, effort and expense. Among the methods employed to control such vegetation is the use of herbicidal compositions. While numerous such compositions have been used successfully in the past, none are available which may be applied satisfactorily under a variety of conditions and for a large variety of purposes. Thus, of the compounds useful in the control of undesirable growth, many are extremely selective, i.e., effective against a limited number of plant species. Few are sufficiently water soluble to permit the preparation of simple dilutions in water, while others may be applied only pre-emergence or post-emergence. Further, most highly effective herbicidal compositions exhibit long-term residual herbicidal activity which prevents their application just prior to planting.

Therefore, it is an object of this invention to provide a method for the control of undesirable plant growth which employs a herbicidal composition which is effective under a variety of conditions, i.e., pre-emergence, post-emergence, application to the locus, application to foliage or leaves; and for a large variety of purposes, that is, the control of a wide variety of plant species.

A further object of the present invention is to provide aqueous compositions for the control of undesirable plant growth which are readily prepared by simple dilution in water of highly effective herbicidal compounds.

Another object of this invention is to provide a herbicidal composition having a limited period of residual activity, thus enabling them to be employed shortly before planting.

These and other objects and advantages of the present invention will become more apparent from the detailed description thereof set forth hereinbelow.

According to the present invention, a method is provided for controlling the growth of undesirable plants, plant life or vegetation which comprises applying to the vegetation or to the locus containing the seeds of vegetation or undesirable plant species a herbicidally effective amount of 3-amino-3-carboxypropyl methyl sulfoximine and the salts thereof.

Among the salts contemplated are the sulfate, nitrate, halide, such as the chloride, phosphate, acetate, propionate, butyrate, gulconate, ammonia, dimethylamine, diethylamine, alkanolamine such as ethanolamine, alkali metal salts such as the sodium or potassium salts and the alkaline earth metal salts such as calcium and magnesium salts. These salts and their equivalents may be prepared by conventional procedures as by introducing the sulfoximine into an aqueous medium and reacting it with the appropriate inorganic, organic, acid amine, alkali metal or alkaline earth metal base. Illustratively, they may be prepared as follows:

PREPARATION OF SULFOXIMINE SALTS

3-AMINO-3-CARBOXYPROPYL METHYL SULFOXIMINE HYDROGEN SULFATE

To 18 grams of methionine sulfoximine (0.1 mole) in 50 ml. of water is slowly added 10 ml. of concentrated sulfuric acid with stirring. The mixture is cooled to 0–5° C. and ethanol added to precipitate the crude 3-amino-3-carboxypropyl methyl sulfoximine hydrogen sulfate. This is recrystallized from water-ethanol mixtures to melting point 190°–192° C.

3-AMINO-3-CARBOXYPROPYL METHYL SULFOXIMINE DIHYDROGEN PHOSPHATE

To 50 cc. of 10% phosphoric acid, is added 9.0 grams of methionine sulfoximine. The solution is concentrated under vacuum at 35° C. until a precipitate is observed; crystallization is completed by cooling to 5° C. The product is collected by filtration.

3-AMINO-3-CARBOXYPROPYL METHYL SULFOXIMINE HYDROCHLORIDE

Five grams of methionine sulfoximine is dissolved in methanol. The solution is then saturated with dry hydrogen chloride. When the solvent is evaporated, 6.0 grams of the desired salt is recovered.

The following salts are illustrative of those which can be prepared in an analogous manner by substituting an equivalent of the appropriate acid in place of the hydrogen chloride:

3-amino-3-carboxypropyl methyl sulfoximine gulconate
3-amino-3-carboxypropyl methyl sulfoximine picrate The herbicidal compositions usable in the process of this invention may be prepared by admixing the active 3-amino-3-carboxypropyl methyl sulfoximine compound, including salts thereof, with any of the inert liquid or solid carriers generally employed in the preparation of agricultural sprays, dusts or wettable powder formulations.

Liquid formulations may be prepared by dissolving the active compound in water and, if desired to increase active content of a composition, adding thereto from about 0.1 to 2% of a suitable surface active agent or emulsifying agent.

Dry formulations may be prepared by admixing the active component with an inert solid carrier such as Attaclay, diatomaceous earth, talc, pumice, kaolin, fuller's earth, chalk, wood flour, silica, charcoal, activated carbon or other inert powders. In such formulations, approximately 50 to 98% by weight of the composition is in the form of the inert carrier.

Wettable powder compositions may be prepared by blending an inert solid carrier such as those referred to above and in particular Attaclay with an amount of a suitable emulsifying agent. The active compounds containing wettable carrier are then dispersed in appropriate quantities of water to provide the proper concentration of active ingredient for the proposed end use.

The compositions of this invention, when used for post-emergence control of undesirable perennial vegetation, is employed in amounts of at least 5 pounds per acre of active compound. For post-emergence control of undesirable annuals, at least ¼ pound of active ingredient per acre is desirable; and for pre-emergence control of annuals and perennials a minimum of about 10 pounds per acre of active compound is desirable.

Although the compounds of the instant invention have demonstrated a high order of activity when applied properly as stated above, they have also demonstrated short-term residual activity. This feature contributes significantly to the usefulness of the compounds in that it permits herbicidal application to a locus just prior to planting. It will also be noted that the compounds of this invention when applied to the foliage of certain perennials are translocated through the foliage into the buds or to the root parts of the plant, thereby inhibiting or preventing the regrowth of such plant parts.

In order that the present invention may be more clearly understood, the following examples are given primarily by way of illustration. No specific details or enumerations contained therein should be construed as limitations on the present invention except insofar as they appear in the appended claims. All parts and percentages are by weight unless otherwise specifically designated.

*Example 1*

Effectiveness of the 3-amino-3-carboxypropyl methyl sulfoxamine hydrogen sulfate as a broad-spectrum or selective post-emergence herbicide is clearly demonstrated by the results of the following tests wherein healthy monocotyledon and dicotyledon plants, approximately two weeks old, are treated with solutions containing graded levels of active ingredient.

In these tests 45 dicotyledon species and 22 monocotyledon species growing in small containers are sprayed to the point of runoff with water solutions containing 3-amino-3-carboxypropyl methyl sulfoximine hydrogen sulfate in quantities determined to produce treatments equivalent to ½, 1 and 5 pounds of herbicide active ingredient per acre.

After treatment the plants are placed in a greenhouse and cared for in the usual manner. Three weeks after treatment the tests are terminated. All plants are examined 3 weeks after treatment and the results recorded. These results appear in Table I below where effectiveness is rated according to the herbicide activity index set forth hereinbelow.

Herbicide Activity Index a  Symptoms caused by sprays are a yellow or yellow-green area that eventually collapses or at sublethal effective rates slowly recovers.
b  Rate of application was 4 lb./acre.
5=all foliage killed.
5−=95–100% stand reduction.
4=50% stand reduction.
3=severe injury.
2=moderate injury.
1=slight injury.
D=underground plant parts dead.
D+=most underground plant parts dead; *one* plant grew from underground.
GB=plants green at the base.
R=regrowth that filled the crocks.
T=trace of yellow-green remaining.

TABLE I.—BROAD-SPECTRUM HERBICIDAL ACTIVITY OF 3-AMINO-3-CARBOXY PROPYL METHYL SULFOXIMINE HYDROGEN SULFATE

| | Test Species | Herbicide Activity,a Rate (lb./acre.) | | | Test Species | Herbicide Activity,a Rate (lb./acre.) | | |
|---|---|---|---|---|---|---|---|---|
| | | 5 | 1 | ½ | | 5 | 1 | ½ |
| Dicots | Broccoli | *b 5 | *5 | *5 | Tobacco | *b 5 | 5 | 2 |
| | Cauliflower | *b 5 | *5 | *5 | Turnip | 5 | 5 | |
| | Chard, Swiss | 5 | 5− | >4+ | Chickweed, Mouse-Ear | **5 | R5 | |
| | Collards | *b 5 | *5 | *5− | Mallow, Indian | 5 | 5− | |
| | Flax | *b 5− | *5− | *5− | Ragweed, Common | | 5 | |
| | Mustard | 5 | *5 | *5 | Tarweed | 5 | 5 | |
| | Pea | *b 5− | *5− | *5− | Mustard, Wild spp | | 5 | |
| | Pepper | 5 | 5 | 5 | Cabbage | 5 | 0 | |
| | Radish | 5 | 5 | *5 | Kohlrabi | 5− | 4 | |
| | Sugarbeet | 5 | 5− | 5− | Lettuce | *b 5 | 0 | 0 |
| | Tomato | 5 | 5 | *5 | Salsify | *b 5− | *3+ | *3+ |
| | Trefoil, Birdsfoot | b 5− | 5− | *5− | Soybean | *b 5 | *2 | *4 |
| | Bindweed, Field | Rb5 | R5 | R5 | Squash | 5 | 1 | |
| | Chickweed, Common | 5 | 5− | *5 | Sunflower | 5− | 4 | |
| | Pigweed | 5 | 5− | 5− | Canada Thistle | *R5 | *1 | *0 |
| | Purslane | 5 | 5 | 5− | Knotweed | 5 | 3 | |
| | Alfalfa | *b 5− | *4+ | *3+ | Lamb's-quarters | *5 | *3+ | *3+ |
| | Cotton | 5 | 5− | *4 | Spurge, Spotted | 5 | | |
| | Clover, Red | *b 5− | *5− | 3+ | Celery | *2 | *1 | *1 |
| | Endive | *b 5− | *5− | 3+ | Clover, White | b 3 | 1 | |
| | Snapbean | 5 | 5 | | Clover, Sweet | b 0+ | 0 | 0 |
| | Spinach | 5 | 5− | | Parsnip | 1 | 0 | 0 |
| | Carrot | *b 5− | *4+ | *3+ | | | | |
| Monocots | Onion | *b 5 | *5− | *4+ | Wild oats | 3 | 0 | 0 |
| | Millet | 5 | 5− | 2 | Barley | 3−3− | 0 | |
| | Oats | *b 5− | *1 | *1 | Rye, Winter | 3 | 0 | 0 |
| | Crabgrass | 5 | 5− | 0−4− | Wheat | 4 | 0 | 0 |
| | Foxtail, Giant & Green | b 5− | *5− | *3+ | Bentgrass | 4 | 0 | 0 |
| | Corn | *b 5− | *3 | *3 | Fescue, Creeping | 4 | 0+ | |
| | Bluegrass, Ky | 5 | 3+ | *1−3 | Ryegrass | 3 | 0 | |
| | Fescue, Pennlawn | *b 4+ | *1 | *0+ | Leek | *0 | *0 | *0 |
| | Nutsedge, Purple | 4+ | 0 | 0 | Barnyard Grass | 0 | 0 | 0 |
| | Cheatgrass | 4+ | | | Foxtail, Green | 0 | 0 | |
| | Quackgrass | 5 | 0 | | Johnson Grass | 5 | 5 | |

*0.1% of sodium salt of 2-ethyl hexyl sulfosuccinate wetting agent added to the spray solution.
**These were established plants of mouse-ear chickweed and control at 5 lb./acre. without subsequent regrowth, demonstrates systemic activity on a dicotyledon plant species.

*Example 2*

The unusual foliar systemic activity which the compounds of the instant invention exhibit with respect to certain perennial plants is demonstrated by the following tests where established Johnson grass and quackgrass plants, in 1 quart glazed crocks, were sprayed at 86 gal. of $H_2O$ per acre with aqueous solutions of 3-amino-3-carboxypropyl methyl sulfoximine hydrogen sulfate containing 0.1%, by weight, of sodium dicotylsulfosuccinate. Rates of foliar application were equivalent to 2.5, 5, 10 and 20 pounds of active ingredient per acre. Ten weeks after application no regrowth from underground plant parts had occurred. While Canada thistle and purple nutsedge were treated in the same manner and the foliage killed, *some* regrowth eventually occurred. In another test, the perennial dicot mouse-ear chickweed was killed at 5 lb./a. and no regrowth from underground plant parts occurred (Example 1).

Results of these tests appear in Table II below where effective ratings are given in accordance with the herbicidal activity index provided in Example 1.

TABLE II.—HERBICIDAL ACTIVITY<sup>a</sup>

[Rate of application—postemergence (lb./acre. in 86 gal. of spray/acre.)]

| Test Species | 20 | 10 | 5 | 2.5 |
|---|---|---|---|---|
| Experiment 1, non-replicated: | | | | |
| Johnson grass— | | | | |
| 3-week data | 5 | 4 | 5 | 1 |
| 10-week data | D5 | R4 | D5 | 1 |
| Quackgrass— | | | | |
| 3-week data | T5 | T5 | 5— | 1 |
| 10-week data | D+5— | D5 | R5— | 1 |
| Canada thistle— | | | | |
| 3-week data | R5 | | | R5 |
| 10-week data | R5 | | | R5 |
| Purple nutsedge— | | | | |
| 3-week data | | GB3 | GB2 | |
| 10-week data | | R3 | R2 | |
| Experiment 2, triplicated, 3-week data: | | | | |
| Johnson grass | 3, 5, 5— | 5, 5, 5— | 5, 5—, 5— | 1, 5, 1 |
| Quackgrass | 5, 5, 5— | 5—, 5—, 5— | 5, 5—, 3 | 1, 2, 1 |

*Example 3*

To demonstrate the effectiveness of the compounds of this invention as pre-emergence herbicides, sufficient quantities of 3-amino-3-carboxypropyl methyl sulfoximine hydrogen sulfate were dissolved in water to provide the desired concentration of ingredient in solution. Half-pint quantities of potting soil are separately seeded to a variety of mono- and dicotyledonous plant species. These seed-soil mixtures are then added to seperate one-pint cups containing about one inch of potting soil. In one series, each cup is wet with twenty-five milliliters of tap water and then with twenty-five milliliters of the herbicidal solution being tested. The treatments are equivalent to 2, 10 and 50 pounds of active ingredient per acre. When the herbicidal solution is added to the various seeded containers, the containers are placed on greenhouse benches and attended to in the conventional manner.

In a second series, the potting soils are prepared and treated with test solutions in the same manner as described above. However, no seeds are introduced into these soils until seven days after treatment with the test solutions.

The first series of seeded pots in this pre-emergence test are examined three weeks after treatment, the second series is examined three weeks after seeding.

The findings are recorded and appear in Table III below. From this table it is evident that the compounds of the instant invention have short-term residual activity, and where application is pre-emergence 10 pounds of active ingredient per acre was an effective control.

TABLE III.—PRE-EMERGENCE AND RESIDUAL HERBICIDAL ACTIVITY<sup>a</sup>

| Test Species | Seeded Immediately | | | Seeded after 7 days Rate (lb./Acre) | | |
|---|---|---|---|---|---|---|
| | 50 | 10 | 2 | 50 | 10 | 2 |
| Bentgrass | 5 | 1 | 0 | 3 | 0 | 0 |
| Bluegrass, Ky | 5— | 5 | 0 | 3 | 0 | 0 |
| Crabgrass | 5 | 1 | 0 | 5 | 0 | 0 |
| Corn | 5 | 2 | 0 | 3 | 0 | 0 |
| Cotton | 5 | 5 | 0 | 3+ | 0 | 0 |
| Fescue | 5— | 1 | 0 | 3 | 0 | 0 |
| Millet | 5 | 5 | 0 | 5 | 0 | 0 |
| Mustard | 5 | 5 | 0 | 5 | 0 | 0 |
| Pigweed | 5 | 5 | 0 | 5 | 0 | 0 |
| Purslane | 5 | 5 | 0 | 5 | 0 | 0 |
| Snapbean | 5 | 5 | 2 | 5 | 5 | 0 |
| Soybean | 5 | 5 | 0 | 5 | 0 | 0 |
| Spinach | 5 | 0 | 0 | 1 | 0 | 0 |
| Tomato | 5 | 0 | 0 | 5 | 0 | 0 |
| Wheat | 5 | 5 | 0 | 5 | 0 | 0 |

*Example 4*

In the following test, barley, oats, winter rye, wheat, crabgrass, alfalfa, wild oats and corn were planted in separate "jiffy flats." On the sixth, eighth, eleventh, fifteenth and twenty-second day after planting, two sets of separate flats, twice replicated and containing the above-identified plant species were sprayed with (1) an aqueous solution of 3-amino-3-carboxypropyl methyl sulfoximine hydrogen sulfate and (2) an aqueous solution of 3-amino-3-carboxypropyl methyl sulfoximine hydrogen sulfate containing 0.1%, by weight, of sodium dioctylsulfosuccinate. Both applications were equivalent to 6 pounds of active ingredient per acre.

Three weeks after spraying each treated series was examined and rated according to the herbicidal activity index given in Example 1.

From the data given in Table IV below it is evident that the addition of a surfactant to the aqueous herbicidal solution increases the activity thereof. There is also limited data which indicate that certain monocots may become more sensitive with age.

TABLE IV.—POST-EMERGENCE ACTIVITY WITH PLANTS OF DIFFERENT AGES

| Test Species | 6 lb./Acre | | | | |
|---|---|---|---|---|---|
| | Time of Application (days after seeding) | | | | |
| | 6 | 8 | 11 | 15 | 22 |
| Barley: | | | | | |
| — | 0 | 0 | 0 | 3+ | 3 |
| + | 0 | 0 | 0 | 4 | 3 |
| Oats: | | | | | |
| — | 3+ | 0 | 0 | 3+ | 4 |
| + | 3+ | 0 | 0 | 4 | 5— |
| Winter Rye: | | | | | |
| — | 0 | 0 | 0 | 0 | 3 |
| + | 0 | 0 | 3 | 3 | 3 |
| Wheat: | | | | | |
| — | 0 | 0 | 0 | 0 | 3 |
| + | 0 | 0 | 3 | 3 | 3 |
| Crabgrass: | | | | | |
| — | 3+ | 0 | 0 | 0 | 4 |
| + | 3+ | 0 | 4+ | 5— | 5 |
| Alfalfa: | | | | | |
| — | 4+ | 5— | 4 | 0 | 0 |
| + | 5 | 5— | 5— | 3+ | 0 |
| Wild oats: | | | | | |
| — | 5— | 4+ | 0 | 3+ | 5 |
| + | 5— | 0 | 0 | 5 | 3+ |
| Corn: | | | | | |
| — | 0 | 0 | 0 | 0 | 3 |
| + | 0 | 5— | 5 | 4+ | 5 |

—=No wetting agent added to the spray solution.
+=0.1% of the sodium salt of dioctyl sulfosuccinate added to the spray solution.

*Example 5*

Following the procedure of Example 1, an aqueous solution of 3-amino-3-carboxypropyl methyl sulfoximine as the free base was applied post-emergence at the rate of 12.5 lbs. of active material per acre to healthy twoweek-old bindweed, Canada thistle, Johnson grass, nutsedge, quackgrass, lambs quarters, mustard, pigweed, barley, crabgrass, wild oats, tomato, radish and wheat plants.

The thus-treated plants were placed in a greenhouse and cared for in the usual manner until the tests were terminated three weeks after treatment.

At the end of three weeks, the plants were examined and rated according to the Herbicide Activity Index described in Example 1. All plants were rated 5 (all foliage killed) excepting nutsedge which was rated 3 (severe injury).

*Example 6*

Following the procedure of Example 3, 3-amino-3-carboxypropyl methyl sulfoximine as the free base was applied pre-emergence at the rate of 25 pounds per acre to potted seeds of millet, mustard, radish and wheat.

At the termination of the test period, the seeded containers were examined and rated according to the herbicide activity index. Millet was rated 5, mustard and radish 5—, and wheat rated trace (T).

*Example 7*

The sulfate, potassium and dimethylamine salts of 3-amino-3-carboxypropyl methyl sufoximine were tested for post-emergence activity against mustard, pigweed, crabgrass, radish and tomato.

Treatments were at the rate of 0.5 pound per acre.

All salts received a 5 rating against mustard and radish; all received a 5— rating again pigweed; the sulfate and potassium salts were rated 4 against crabgrass; the dimethylamine salt rated 3 against crabgrass; and the sulfate rated 5 against tomato, while the potassium salt and dimethylamine salt rated 1 and 3, respectively, against tomato.

In Example 7 above, the potassium salt reported was prepared by dissolving one mole of 3-amino-3-carboxypropyl methyl sulfoximine hydrogen sulfate in an aqeous solution containing 1.5 moles of potassium hydroxide. The dimethylamine salt was prepared in a similar fashion employing 2 moles of dimethylamine.

The herbicidal activity of 3-amino-3-carboxypropyl methyl sulfoximine as the free base or as various salts illustrated above is believed to be unique. This is thought to be demonstrated by the fact that 3-amino-3-carboxypropyl ethyl sulfoximine, the next higher homologue, was determined to be herbicidally inactive. This was determined in post- and pre-emergence tests which employed the ethyl homologue at rates of 10 and 25 pounds per acre, respectively. The post-emergence tests were conducted in accordance with the procedure and on the plants set forth in Example 5 above.

On termination of the experiment, all plants were examined and all were rated 0 according to the herbicide activity index. The pre-emergence tests with the ethyl compound were conducted in accordance with the procedure and plants identified in Example 3 above, and all seeded containers were rate 0 on examination thereof at the termination of the test.

I claim:

1. A method for controlling the growth of undesirable plants which comprises applying to the foliage thereof a herbicidally effective amount of 3-amino-3-carboxypropyl methyl sulfoximine and its herbicidally effective salts.

2. A method according to claim 1 in which the undesirable plants are perennials and the herbicidally effective amount is at the rate of at least about 5 pounds per acre.

3. A method according to claim 1 in which the undesirable plants are annuals and the herbicidally effective amount is at least about ¼ pound per acre.

4. A method according to claim 1 in which the compound is 3-amino-3-carboxypropyl methyl sulfoximine hydrogen sulfate.

5. A method for the pre-emergence control of undesirable plant growth which comprises applying to an area to be protected from such growth a herbicidally effective amount of 3-amino-3-carboxypropyl methyl sulfoximine and its herbicidally effective salts.

6. A method according to claim 5 wherein the amount of compound employed is at least about 10 pounds per acre.

7. A method for controlling undesirable perennial grasses which comprises applying to the grasses a herbicidally effective amount of the herbicidally effective inorganic acid salts of 3-amino-3-carboxypropyl methyl sulfoximine.

8. A method according to claim 7 in which the compound applied is 3-amino-3-carboxypropyl methyl sulfoximine hydrogen sulfate.

References Cited by the Examiner

UNITED STATES PATENTS 3,179,510   4/1965   Husted _____ 71—2.7

OTHER REFERENCES

Chemical Abstracts, vol. 53, column 15236(a), and Subject Index, page 2721(S), 1959.

LEWIS GOTTS, *Primary Examiner.*

JAMES O. THOMAS, *Examiner.*

ELBERT L. ROBERTS, *Assistant Examiner.*